(12) United States Patent
Asayesh et al.

(10) Patent No.: US 6,982,984 B1
(45) Date of Patent: Jan. 3, 2006

(54) METHOD AND APPARATUS FOR VIRTUAL PRIVATE NETWORKS

(75) Inventors: Hamid Asayesh, Fremont, CA (US); Gerald Neufeld, Los Altos, CA (US); Rene Tio, Sunnyvale, CA (US)

(73) Assignee: Redback Networks Inc., San Jose, CA (US)

( * ) Notice: Subject to any disclaimer, the term of this patent is extended or adjusted under 35 U.S.C. 154(b) by 911 days.

(21) Appl. No.: 09/941,223

(22) Filed: Aug. 28, 2001

(51) Int. Cl.
 *H04L 12/56* (2006.01)
(52) U.S. Cl. .................... 370/401; 370/230; 370/409; 370/474; 713/409
(58) Field of Classification Search ................ 370/338, 370/400, 401, 474, 409, 235, 392, 230; 709/241, 709/238; 713/201
See application file for complete search history.

(56) References Cited

U.S. PATENT DOCUMENTS

| | | | |
|---|---|---|---|
| 6,226,751 B1 * | 5/2001 | Arrow et al. ............... 713/201 |
| 6,493,349 B1 * | 12/2002 | Casey ........................ 370/409 |
| 6,633,571 B1 * | 10/2003 | Sakamoto et al. .......... 370/401 |
| 6,694,437 B1 * | 2/2004 | Pao et al. .................... 713/201 |
| 6,779,051 B1 * | 8/2004 | Basil et al. .................... 710/33 |
| 2002/0016926 A1 * | 2/2002 | Nguyen et al. ............. 713/201 |
| 2002/0069292 A1 * | 6/2002 | Gaddis et al. .............. 709/238 |
| 2002/0093915 A1 * | 7/2002 | Larson ........................ 370/235 |
| 2002/0097724 A1 * | 7/2002 | Halme et al. ............... 370/392 |
| 2002/0097732 A1 * | 7/2002 | Worster et al. ............. 370/408 |
| 2002/0163920 A1 * | 11/2002 | Walker et al. .............. 370/401 |
| 2003/0016679 A1 * | 1/2003 | Adams et al. .............. 370/401 |

OTHER PUBLICATIONS

D. Farinacci, et al., "Generic Routing Encapsulation (GRE)", Network Working Group, Standards Track, Mar. 2000, pp 1-9. http://www.isis.edu/in-notes/rfc278.
K. Muthukrishnan, et al., "A Core MPLS IP VPN Architecture", Core VPNs, Sep. 2000, pp 1-16. http://www.isi.edu/in-notes/rfc291.
E. Rosen, et al. "Multiprotocol Label Switching Architecture", Standards Track, Jan. 2001, pp 1-61. http://www.ietf.org/rfc/rfc3031.txt.

* cited by examiner

*Primary Examiner*—Ricky Ngo
*Assistant Examiner*—Nguyen H. Ngo
(74) *Attorney, Agent, or Firm*—Blakely, Sokoloff, Taylor & Zafman

(57) ABSTRACT

A method and apparatus for virtual private networks (VPNs) is described. A computer implemented method comprises determining a set of endpoints for a generic routing encapsulation (GRE) tunnel, determining a key (the key corresponding to a VPN), dynamically establishing the GRE tunnel with the set of endpoints and the key, and processing a set of GRE traffic for the VPN.

24 Claims, 6 Drawing Sheets

METHOD AND APPARATUS FOR VIRTUAL PRIVATE NETWORKS

FIELD OF THE INVENTION

The invention relates to the field of communication. More specifically, the invention relates to communication networks.

BACKGROUND OF THE INVENTION

Virtual Private Networks (VPNs) extend an entity's (e.g., a corporation, Internet Service Provider (ISP), etc.) network backbone out to the Internet. The connectivity costs for VPNs are less than leasing a line and fault tolerance is improved because of multiple pathways between sites. Instead of an entity purchasing, administrating and maintaining additional network elements (e.g. routers, hubs, switches, subscriber management systems, etc.), an entity can securely transmit traffic through the Internet with VPNs. Corporations seek to extend their corporate networks to enable their telecommuters and individual offices to function as a single secure network. ISPs employ VPNs to extend their networks to maintain control of their subscribers at lower costs.

Unfortunately, VPNs are implemented with costly protocols, such as IPSec and MPLS. The addition of edge devices or routers requires configuration on more than just the endpoints of the VPN to support such VPNs. The intermediate network elements also require configuration. These administrative costs slow the process of adding equipment and/or adding VPNs. In addition, supporting VPNs implemented with these protocols also becomes costly.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE DRAWINGS

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1A:
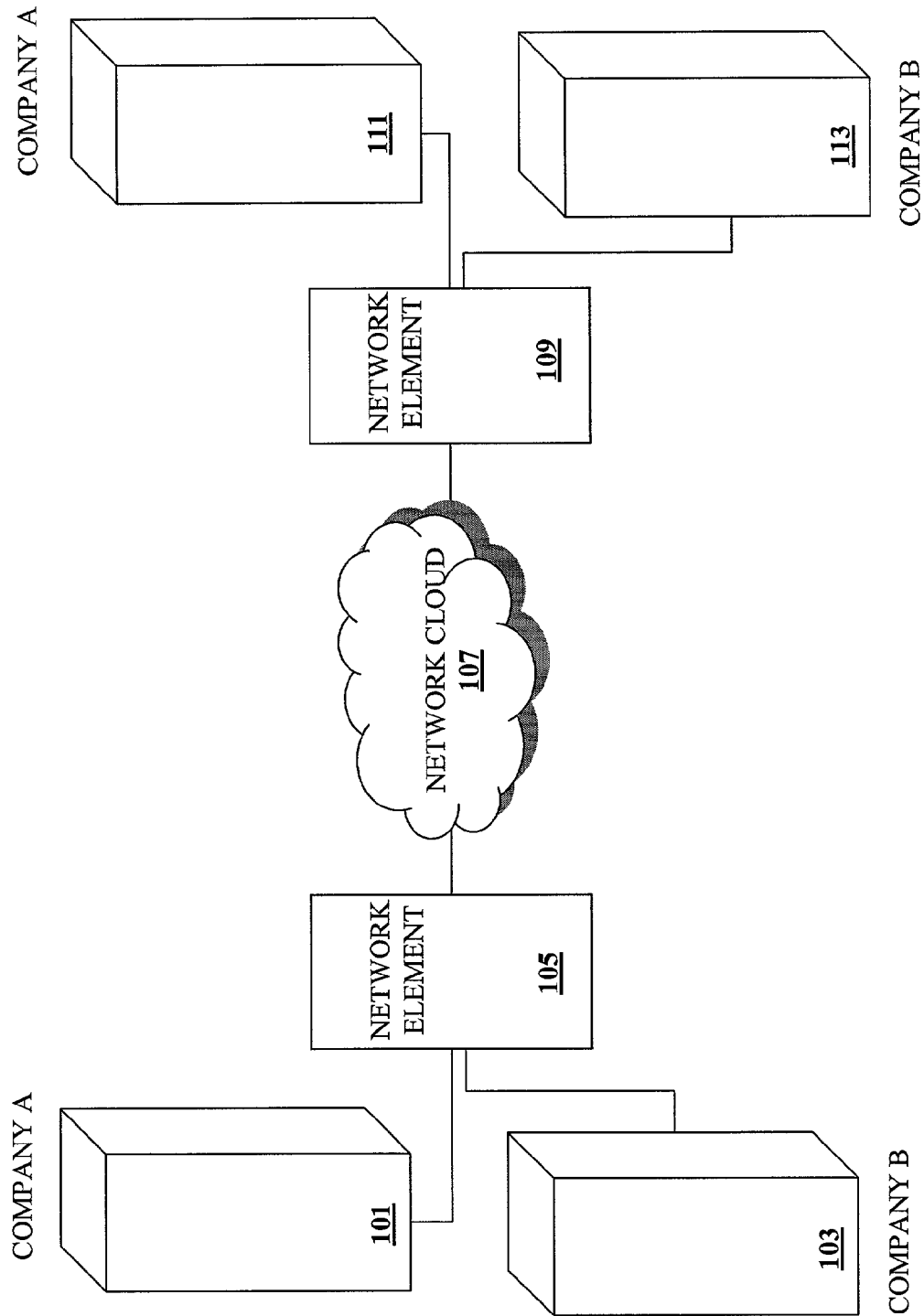
FIG. 1A is a diagram illustrating an exemplary network according to one embodiment of the invention.

FIG. 1A is a diagram illustrating an exemplary network according to one embodiment of the invention. In FIG. 1A, a site for company A 101 and a site for company B 103 are coupled with network element 105. The sites 101 and 103 can be main offices, branch offices, etc. The network element 105 is coupled with a network element 109 via a network cloud 107. The network element 109 is coupled with a second site for 111 company A and a second site for 113 company B. The network element 105 receives traffic from the company A site 101 and the company B site 103 and transmits the traffic through the network cloud 107 to the network element 109. The network element 105 also receives traffic from the network element 109 through the network cloud 107 and directs the traffic to the company A site 101 and the company B site 103 appropriately. Likewise, the network element 109 receives traffic from the company A site 111 and the company B site 113 and transmits the traffic through the network cloud 107 to the network element 105. The network element 109 also directs traffic received through the network cloud 107 to the company A site 111 and the company B site 113 appropriately.

Figure 1B:
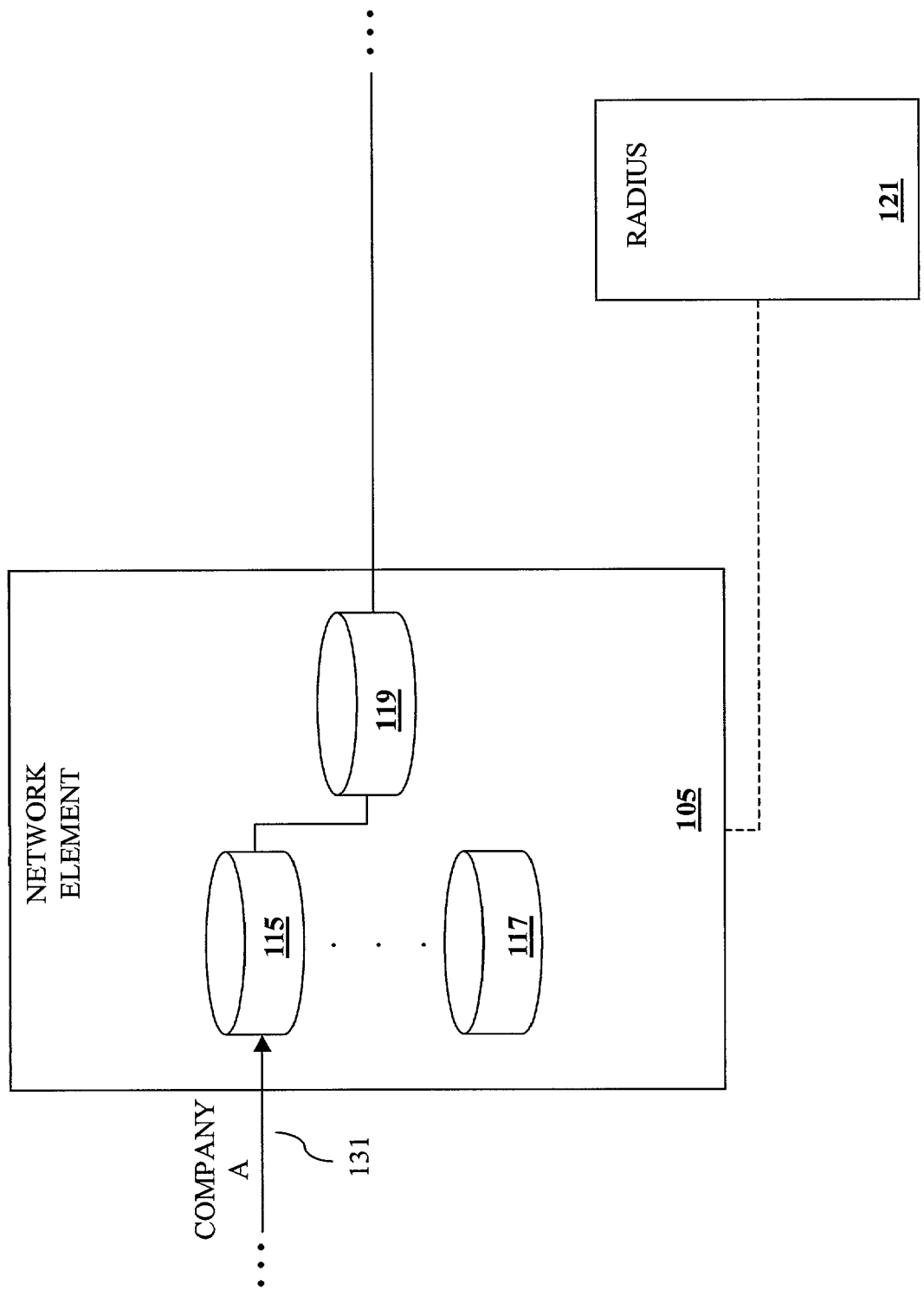
FIG. 1B is a diagram illustrating the network element 105 establishing a generic routing encapsulation virtual private network (GRE VPN) according to one embodiment of the invention.

FIG. 1B is a diagram illustrating the network element 105 establishing a generic routing encapsulation virtual private network (GRE VPN) according to one embodiment of the invention. In FIG. 1B, the network element 105 hosts virtual routers 115, 117, and 119. The virtual router 115 is configured for company A. The virtual router 117 is configured for company B. Traffic received from the company A site 101 by the network element 105 is processed by the virtual router 115. In this example, traffic 131 is received by the network element 105 from the company A site 101. The traffic 131 indicates a tunnel. The network element 105 queries a remote access dial-up server (RADIUS) 121 with the GRE tunnel name. The RADIUS 121 returns a set of endpoints for the GRE tunnel. In this example, the set of endpoints are network addresses that correspond to the network element 105 and the network element 109. After receiving a set of endpoints from the RADIUS 121, the network element 105 makes a second query to the RADIUS 121 with the set of endpoints and a key corresponding to the company A. The RADIUS 121 returns to the network element 105 a second set of endpoints corresponding to company A.

In an alternative embodiment, the sets of endpoints are stored on the network element 105 instead of 121. In another embodiment of the invention, the set of endpoints are stored on a network storage device coupled with the network element 105. In this example, one of the first set of endpoints is the Internet Protocol (IP) address corresponding to the virtual router 119 while one of the second set of endpoints is the IP address of the virtual router 115. The set of endpoints can be implemented as MAC addresses, ATM circuit identifiers, etc. The virtual router 119 can be a virtual backbone router, a virtual local router, etc., for the network element 105.

The network element uses the first and second set of endpoints to configure an interface of the virtual router 115 to an interface of the virtual router 119. The network element 105 transmits the key for company A and the first set of endpoints, which include the IP address for the virtual router 119 and the IP address for the termination point of the GRE tunnel, to the termination point. In the described example, the termination point of the GRE tunnel is the network element 109.

Figure 1C:
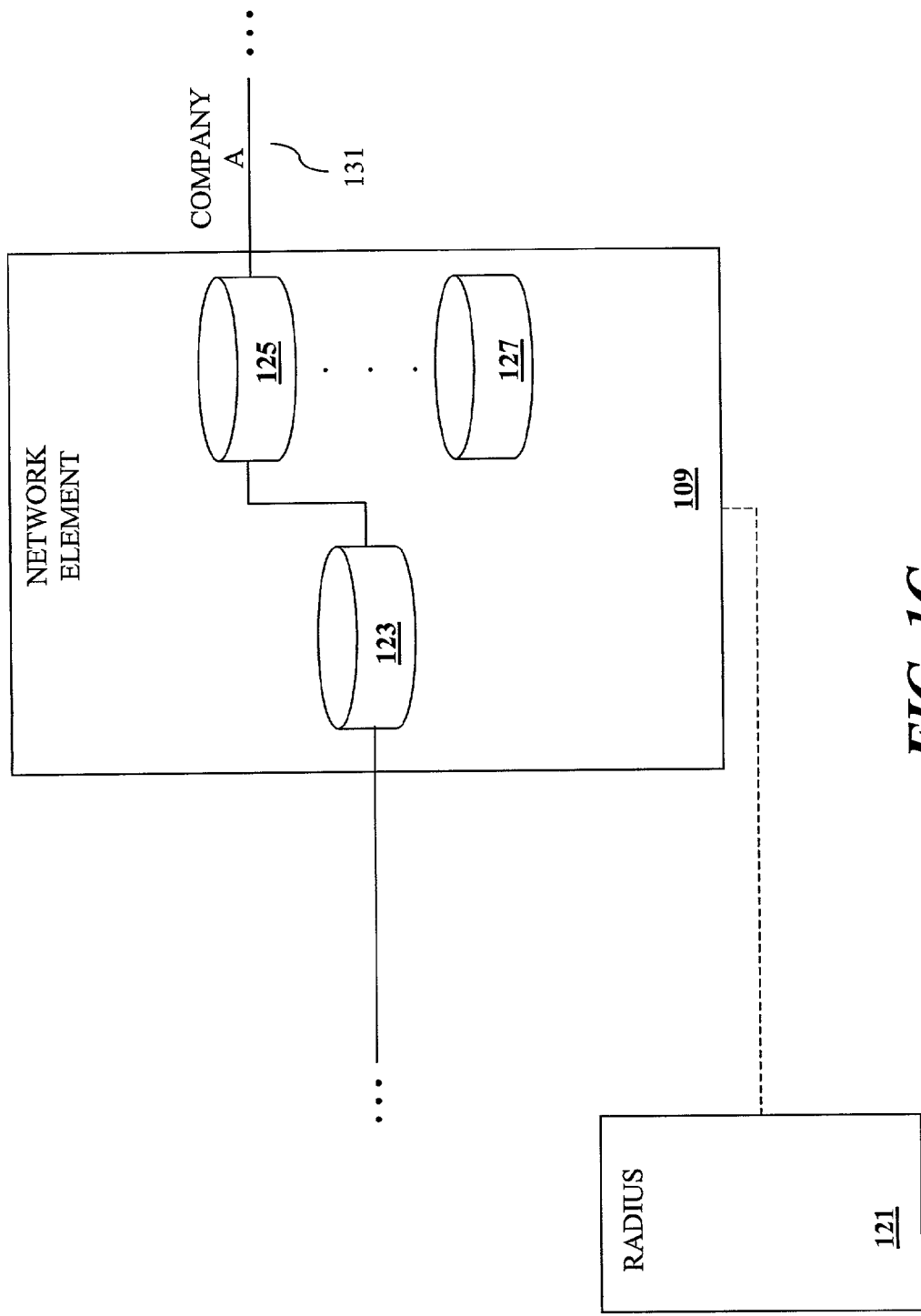
FIG. 1C is a diagram illustrating dynamic establishment of the GRE VPN according to one embodiment of the invention.

FIG. 1C is a diagram illustrating dynamic establishment of the GRE VPN according to one embodiment of the invention. In FIG. 1C, the network element 109 hosts virtual routers 123, 125, and 127. The virtual router 123 could be configured as a backbone router, a local router, etc. The virtual router 125 is configured for company A. The virtual router 127 is configured for company B. The network element 109 receives the traffic transmitted from the network element 105 that includes the first set of endpoints for the GRE tunnel and the key for company A. The network element 109 queries the RADIUS 121 with the first set of endpoints and the key. The RADIUS 121 returns the second set of endpoints could be stored locally, in a network storage device, or a different RADIUS. In this example, a second one of the second set of endpoints is the IP address for the virtual router 125 while the second one of the first set of endpoints is the IP address for the virtual router 123. The network element 109 configures an interface of the virtual router 125 to an interface of the virtual router 123. The virtual router 123 receives the traffic 131 for the company A site 111 from the network element 105 and forwards the traffic to the virtual router 125.

Figure 1D:
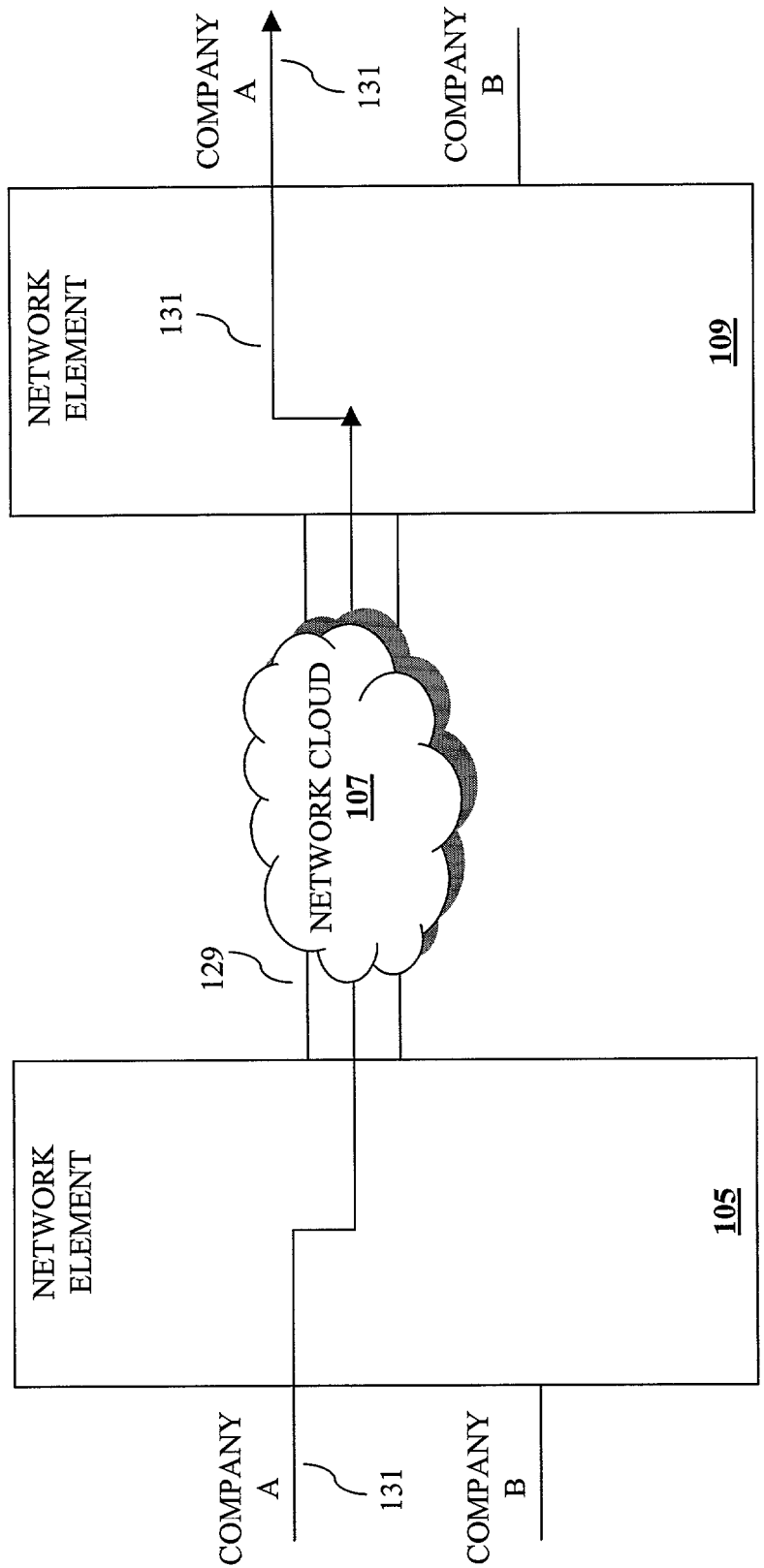
FIG. 1D is a diagram illustrating traffic being transmitted over the GRE VPN according to one embodiment of the invention.

FIG. 1D is a diagram illustrating traffic being transmitted over a GRE VPN according to one embodiment of the invention. In FIG. 1D, a generic routing encapsulation (GRE) tunnel 129 has been established between the network element 105 and the network element 109 through a network cloud 107. The company A site 101 can securely transmit traffic 131 to the company A site 111 via the GRE tunnel 129.

Figure 1E:
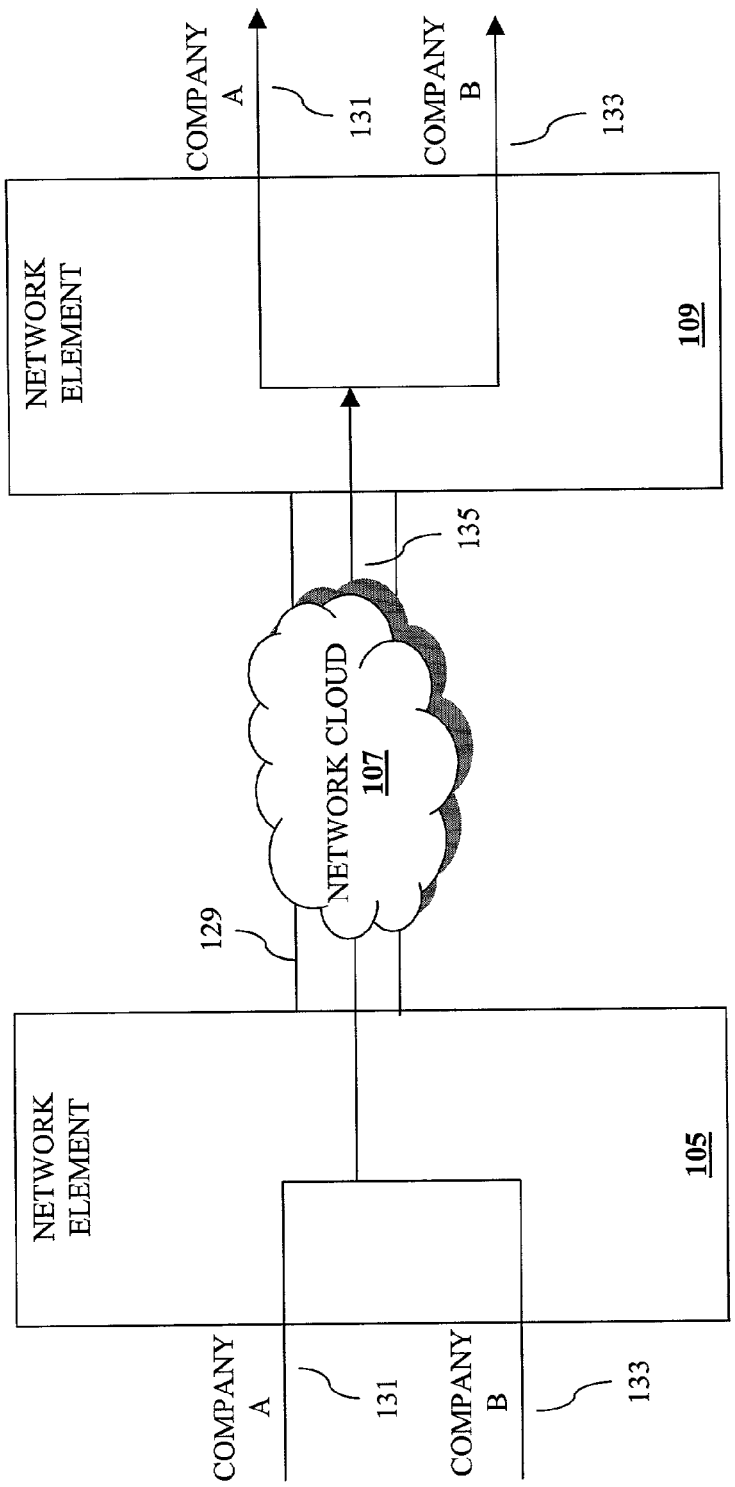
FIG. 1E is a diagram illustrating multiple VPNs over a single GRE tunnel according to one embodiment of the invention.

FIG. 1E is a diagram illustrating multiple VPNs over a single GRE tunnel according to one embodiment of the invention. In FIG. 1E, the company B site 103 is transmitting traffic to the company B site 113. The traffic 131 from company A site 101 and the traffic 133 from company B site 103 both traverse the GRE tunnel 129. Provisioning multiple VPNs per tunnel results in fewer interfaces being configured and fewer addresses being required. At the network element 105, the traffic 131 and the traffic 133 are multiplexed into a traffic 135. The multiplexed traffic 135 traverses the GRE tunnel 129 and enters the network element 109. At the network element 109, the keys indicated in the multiplexed traffic 135 are used to de-multiplex the traffic 135 into the traffic 131 and the traffic 133. The traffic 131 and the traffic 133 are forwarded to the company A site 111 and the company B site 113 respectively.

With GRE VPNs, a service provider or carrier can outsource their wide area network for transport services. Service providers and carriers do not have to dedicate network elements to a single customer with GRE VPNs. With GRE VPNs, VPN services can be offered to multiple customers who may have overlapping address space. In addition, the characteristics of GRE enable quicker provisioning of GRE VPNs with lower administrative and support costs. For example, the administrative costs of adding a new network element or new VPN are low.

Moreover, dynamically establishing GRE VPNs provides security since 1) resource consumption upon detection of an unknown key is limited to a database query and state information and; 2) a hostile attack must spoof the source and destination addresses of the GRE tunnel and guess the key for the VPN. Security can be enhanced by ensuring that an unknown key packet originates from an interior source and not an exterior source. One method for implementing the enhancement would be to look up the source address of the packet in a routing table and ensuring that the route to the source address is 1) known, 2) not the default, and 3) learned via a network update protocol, such as the interior gateway protocol (IGP).

Figure 2:
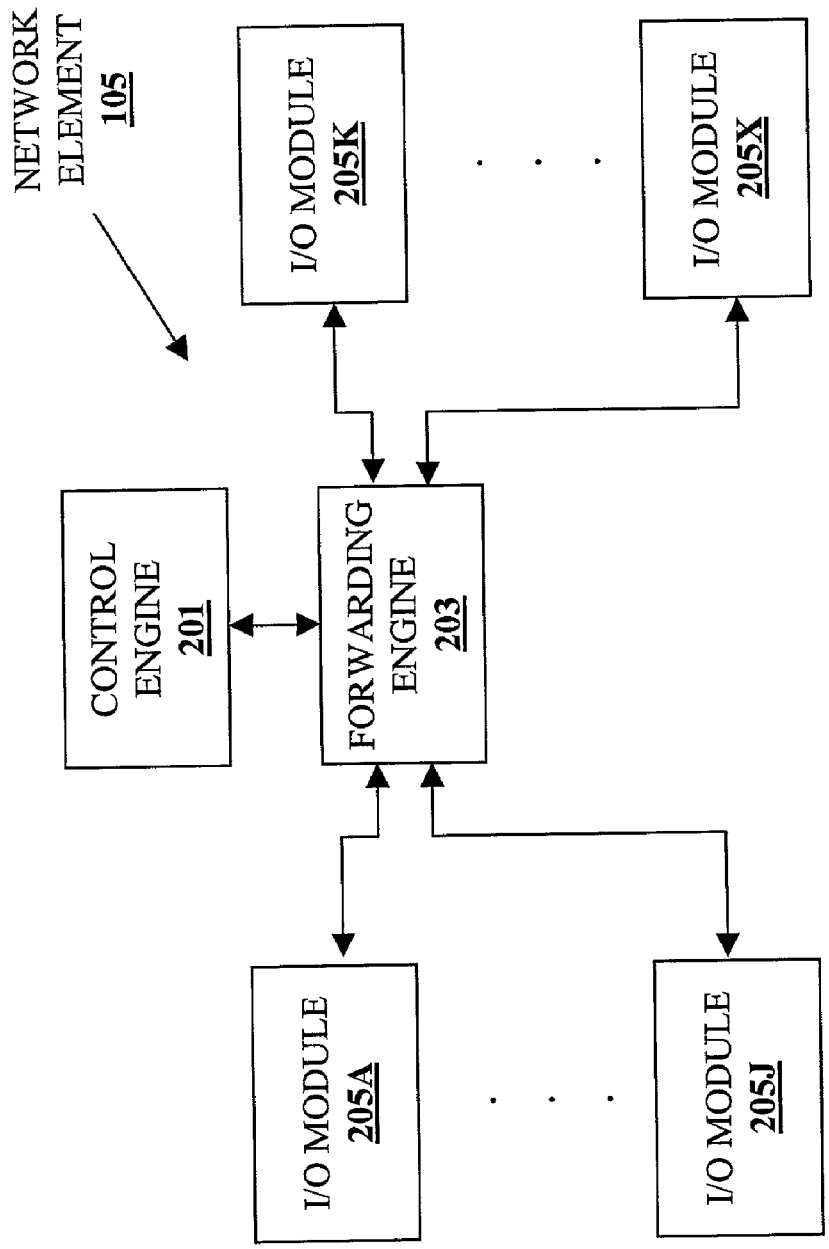
FIG. 2 is a diagram illustrating the network element 105 according to one embodiment of the invention.

FIG. 2 is a diagram illustrating the network element 105 according to one embodiment of the invention. The network element illustrated in FIG. 2 could be the network element 105 or 109. In FIG. 2, a control engine 210 is coupled with a forwarding engine 203. The control engine 201 performs the queries for the GRE tunnel attributes and VPN information. The forwarding engine 203 hosts virtual routers including the virtual routers 115, 117, and 119. The forwarding engine 203 is coupled with input/output modules 205A–205X. The I/O modules 205A–205X process traffic to be transmitted and process traffic that has been received.

The control engine 201 and the forwarding engine 203 illustrated in FIG. 2 include memories, processes, and/or Application Specific Integrated Circuit ("ASICs"). Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the invention has been described in terms of several embodiments, those skilled in the art will recognize that the invention is not limited to the embodiments described. For example, keys can be defined globally or regionally. In an embodiment of the present invention, regional keys are used in conjunction with regional indicators to identify a VPN. In another embodiment of the present invention, a tunnel is provisioned for each VPN. In another embodiment of the present invention, multiple VPNs are provisioned for a tunnel.

The method and apparatus of the invention can be practiced with modification and alteration within the spirit and scope of the appended claims. For example, the present invention can be implemented with another tunneling protocol similar to GRE. The description is thus to be regarded as illustrative instead of limiting on the invention.

We claim:

1. A computer implemented method comprising:
in response to a request for establishing a generic routing encapsulation (GRE) tunnel received at a first network element, the first network element determining a set of endpoints for the requested GRE tunnel based on the request;
determining a key, the key corresponding to a virtual private network (VPN);
dynamically establishing the GRE tunnel with the set of endpoints and the key between the first network element and a second network element, the second network element being identified by the set of endpoints; and
processing a set of GRE traffic for the VPN within the established GRE tunnel between the first and second network elements over a network provided by a network provider.

2. The computer implemented method of claim 1 wherein the set of endpoints comprises a first set of endpoints, wherein the method further comprises:
the first network element determining the first set of endpoints based on an ID of the requested GRE tunnel, the first set of endpoints identifying the second network element; and the first network element transmitting the first set of endpoints and the key to the second network element to enable the second network element to respond in establishing the GRE tunnel with the first network element.

3. The computer implemented method of claim 2, wherein the set of endpoints further comprises a second set of endpoints, wherein the method further comprises:
the first network element determining the second set of endpoints based on the first set of endpoints and the key, the first and second sets of endpoints identifying a first and second virtual routers of the first network element, the first virtual router interfacing with a first site of an entity from which the request is originated and the second virtual router interfacing with the second network element; and
directing network traffic between the first and second virtual routers, where the second virtual router exchanges the network traffic with the second network element via the GRE tunnel.

4. The computer implemented method of claim 3, wherein the set of endpoints further comprises a third set of endpoints, wherein the method further comprises:
receiving at a third virtual router of the second network element the first set of endpoints and the key received from the first network element, the third virtual router interfacing the second network element with the first network element via the GRE tunnel;
the second network element determining the third set of endpoints based on the first set of endpoints and the key, the third set of endpoints identifying a fourth virtual router interfacing the second network element with a second site of the entity; and
directing the network traffic between the third and fourth virtual routers, where the fourth virtual router exchanges the network traffic with the second site of the entity.

5. The computer implemented method of claim 4 wherein the first network element accesses a remote server to determine the first set of endpoints based on the ID of the requested GRE tunnel, wherein in response to the first set of endpoints, the first network element access the remote server to determine the second set of endpoints using the first set of endpoints and the key, and wherein in response to the first set of endpoints and the key received from the first network element, the second network element accesses the remote server to determine the third set of endpoints.

6. The computer implemented method of claim 4 wherein the entity is a first entity and the first and second sites of the first entity exchange network traffic via a first VPN within the GRE tunnel, wherein the method further comprises establishing a second VPN within the GRE tunnel between a third site and a fourth site of a second entity to enable the third and fourth sites of the second entity to exchange network traffic via the second VPN within the GRE, such that the first and second entities share the GRE tunnel using the first and second VPNs.

7. The computer implemented method of claim 6 wherein the remote server comprises a RADIUS, wherein the second and third set of endpoints comprise substantially identical information retrieved from the RADIUS, and wherein the first and second entities are different organizations sharing the first and second network elements to traverse through the network of the network provider.

8. A system comprising:
a first network element to determine a key and a first set of endpoints for a generic routing encapsulation (GRE) tunnel, the key corresponding to a virtual private network (VPN), to determine a second set of endpoints for the GRE VPN based on the first set of endpoints and the key, to configure an initiation point of the GRE tunnel based on the first and second sets of endpoints, to transmit a packet having the first set of endpoints and the key; and
a second network element coupled with the first network element, the second network element to receive the packet, to determine the second set of endpoints for the GRE VPN using the received first set of endpoints and the key, and to establish the GRE tunnel with the first network element using the first and second sets of endpoints.

9. The system of claim 8 further comprising a third network element, the third network element coupled with the first and the second network element, the third network element to receive a set of data from the first network element and forward the set of data to the second network element, the set of data being for the VPN.

10. The system of claim 8 wherein the second set of endpoints are indexed by the first set of endpoints and the key.

11. The system of claim 8 wherein to configure the initiation point comprises to configure one of the second set of endpoints to one of the first set of endpoints.

12. An apparatus comprising:
a control engine to retrieve a first set of endpoints corresponding to a generic routing encapsulation (GRE) tunnel based on an ID of the GRE tunnel, to retrieve a second set of endpoints corresponding to the first set of endpoints and a key, the key corresponding to a virtual private network (VPN); and
a forwarding engine coupled with the control engine, the forwarding engine to establish an initiation point of the GRE tunnel using the first and second sets of endpoints and to transmit a set of traffic over the GRE VPN with a termination point of the GRE tunnel over a network of a network provider, wherein at least one of the first and second sets of endpoints identifies the termination point of the GRE tunnel.

13. The apparatus of claim 12 wherein the forwarding engine to host a first and second virtual router, the first virtual router corresponding to one of the first set of endpoints and the second virtual router corresponding to one of the second set of endpoints.

14. The apparatus of claim 12 wherein the second set of endpoints are indexed by the key and the first set of endpoints.

15. An apparatus comprising:
an input/output module to receive a set of data from a network element over a network, the set of data indicating a key and a first of set of endpoints of a generic routing encapsulation (GRE) tunnel, the key corresponding to a virtual private network (VPN); and
a control engine coupled with the input/out module, the control engine to determine a second set of endpoints for the VPN with the key and the first set of endpoints; and
a forwarding engine coupled with the control engine and the input/output module, the forwarding engine to dynamically establish the GRE tunnel with the network element over the network using the first set of endpoints and the second set of endpoints and to process a set of traffic for the VPN.

16. The apparatus of claim 15 wherein the second set of endpoints are indexed by the key and the first set of endpoints.

17. The apparatus of claim 15 wherein to establish the GRE tunnel comprises:
   to configure one of the second set of endpoints to one of the first set of endpoints; and
   to indicate the key in a list of keys.

18. A machine-readable medium that provides instructions, which when executed by a set of one or more processes, cause said set of processors to perform operations comprising:
   retrieving a first set of endpoints of a genetic routing encapsulation (GRE) tunnel based on a name of the GRE tunnel in response to a request for establishing the GRE tunnel, the first set of endpoints identifying a termination point of the GRE tunnel;
   determining a second set of endpoints with the first set of endpoints and a key, the key corresponding to a virtual private network (VPN);
   establishing an initiation point of the GRE tunnel with the first set of endpoints and the second set of endpoints;
   transmitting the first set of endpoints and the key to the identified termination point to establish the GRE, tunnel with the termination point; and
   transmitting a set of traffic over the GRE VPN.

19. The machine-readable medium of claim 18 wherein the establishing the initiation point of the GRE tunnel comprises configuring one of the second set of endpoints to one of the first set of endpoints.

20. The machine-readable medium of claim 18 further comprising:
   receiving a second set of traffic for a second VPN, the second set of traffic indicating the GRE tunnel;
   determining a third set of endpoints with a second key and the first set of endpoints, the second key corresponding to the second VPN;
   configuring one of the third set of endpoints to one of the first set of endpoints;
   transmitting the second key and the first set of endpoints; and
   transmitting the second set of traffic.

21. A machine-readable medium that provides instructions, which when executed by a set of one or more processors, cause said set of processors to perform operations comprising:
   listening for a packet, the packet indicating a first set of endpoints for a generic routing encapsulation (GRE) tunnel and a key, the key corresponding to a virtual private network (VPN);
   in response to the packet received from a network element over a network, retrieving a second set of endpoints for the VPN with the first set of endpoints and the key;
   establishing the GRE tunnel with the network element over the network using the first set of endpoints and the second set of endpoints; and
   processing a set of traffic over the GRE VPN.

22. The machine-readable medium of claim 21 wherein establishing the GRE tunnel comprises:
   configuring one of the second set of endpoints to one of the first set of endpoints; and
   maintaining the key in a list of keys.

23. The machine-readable medium of claim 21 further comprising:
   receiving a second packet, the second packet indicating the first set of endpoints and a second key, the second key corresponding to a second VPN;
   retrieving a third set of endpoints with the second key and the first set of endpoints;
   receiving a second set of traffic; and
   forwarding the second set of traffic to one of the third set of endpoints.

24. The machine-readable medium of claim 21 further comprising:
   receiving a second packet, the second packet indicating a second key;
   determining that the second key is not in a key list; and
   ensuring that the second packet originated from an interior source.

* * * * *